United States Patent
Canberk et al.

(10) Patent No.: US 12,061,842 B2
(45) Date of Patent: Aug. 13, 2024

(54) WEARABLE DEVICE AR OBJECT VOICE-BASED INTERACTION

(71) Applicant: Snap Inc., Santa Monica, CA (US)

(72) Inventors: Ilteris Kaan Canberk, Marina Del Rey, CA (US); Shin Hwun Kang, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 117 days.

(21) Appl. No.: 17/657,840

(22) Filed: Apr. 4, 2022

(65) Prior Publication Data

US 2023/0315383 A1  Oct. 5, 2023

(51) Int. Cl.
| | |
|---|---|
| *G06F 3/16* | (2006.01) |
| *G06T 3/40* | (2006.01) |
| *G06T 7/70* | (2017.01) |
| *G06T 19/00* | (2011.01) |
| *G10L 15/22* | (2006.01) |

(52) U.S. Cl.
CPC .............. *G06F 3/167* (2013.01); *G06T 3/40* (2013.01); *G06T 7/70* (2017.01); *G06T 19/006* (2013.01); *G10L 15/22* (2013.01); *G10L 2015/223* (2013.01); *G10L 2015/228* (2013.01)

(58) Field of Classification Search
CPC ... G06F 3/167; G06T 3/40; G06T 7/70; G06T 19/006; G10L 15/22; G10L 2015/223; G10L 2015/228
See application file for complete search history.

(56) References Cited

U.S. PATENT DOCUMENTS

| | | |
|---|---|---|
| 10,665,036 B1 | 5/2020 | Ha |
| 2013/0242262 A1 | 9/2013 | Lewis |
| 2015/0160917 A1* | 6/2015 | Lee .................. G06F 3/167 715/728 |
| 2016/0148433 A1* | 5/2016 | Petrovskaya .......... G02B 27/01 345/633 |
| 2017/0039613 A1 | 2/2017 | Kaehler et al. |
| 2017/0064207 A1* | 3/2017 | Kim .................... G06F 16/434 |
| 2018/0336009 A1* | 11/2018 | Yoganandan ......... G06F 3/0346 |
| 2020/0005540 A1* | 1/2020 | Challagolla ............ G06T 19/20 |
| 2020/0310748 A1 | 10/2020 | Huang |
| 2021/0097776 A1* | 4/2021 | Faulkner .............. G06V 40/113 |

FOREIGN PATENT DOCUMENTS

KR   20180102200   9/2018

OTHER PUBLICATIONS

"International Application Serial No. PCT/US2023/017417, International Search Report mailed Jun. 27, 2023", 4 pgs.
"International Application Serial No. PCT/US2023/017417, Written Opinion mailed Jun. 27, 2023", 4 pgs.

* cited by examiner

*Primary Examiner* — William A Beutel
(74) *Attorney, Agent, or Firm* — Schwegman Lundberg & Woessner, P.A.

(57) ABSTRACT

Disclosed are systems and methods for voice-based control of augmented reality (AR) objects on a wearable device. The systems and methods perform operations comprising: instructing a display element of the AR wearable device to present a visual indicator representing a cursor; receiving voice input representing a first virtual object; determining a real-world position within a real-world environment being viewed through the AR wearable device based on a current position of the visual indicator; and instructing the display element of the AR wearable device to present the first virtual object within the real-world environment at the real-world position.

20 Claims, 12 Drawing Sheets

WEARABLE DEVICE AR OBJECT VOICE-BASED INTERACTION

TECHNICAL FIELD

The present disclosure relates generally to wearable devices with display systems. Specifically, the present disclosure addresses systems and methods for voice-based control of augmented reality wearable devices.

BACKGROUND

A wearable device may be implemented with a transparent or semi-transparent display through which a user of the wearable device can view the surrounding environment. Such devices enable a user to see through the transparent or semi-transparent display to view the surrounding environment, and to also see objects (e.g., virtual objects such as images, video, text, etc.) that are generated for display to appear as a part of, and/or overlaid upon, the surrounding environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
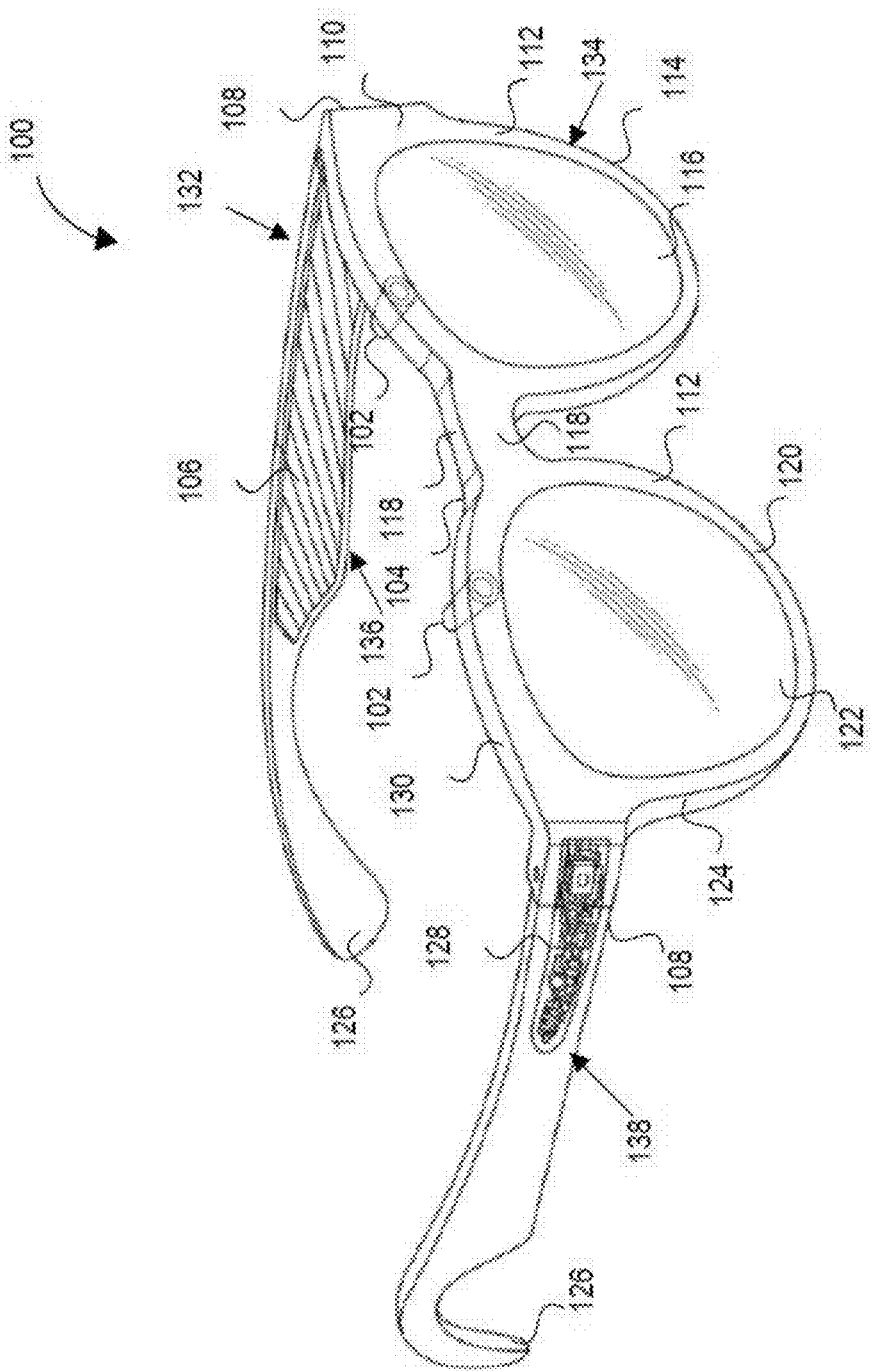
FIG. 1 is a perspective view of a wearable device, in accordance with some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural Components such as modules) are optional and may be combined or subdivided, and operations (e.g., in a procedure, algorithm, or other function) may vary in sequence or be combined or subdivided.

An AR wearable device implemented with a transparent or semi-transparent display enables a user to see through the transparent or semi-transparent display to view the surrounding environment. In addition, the AR wearable device may enable the user to see objects (e.g., virtual objects such as images, video, text) that are rendered in the display of the AR wearable device to appear as a part of, and/or overlaid upon, the surrounding environment. Such an AR wearable device may provide an augmented reality experience for the user.

The rendering of the virtual object may be based on a position of the wearable device relative to a physical object or relative to a frame of reference (external to the wearable device) so that the virtual object correctly appears in the display. The virtual object appears aligned with a physical object as perceived by the user of the AR wearable device. Graphics (e.g., graphical elements containing instructions and guides) appear to be attached to a physical object of interest. In order to do this, the AR wearable device detects the physical object and tracks a pose of the AR wearable device relative to a position of the physical object. A pose identifies a position and orientation of the object relative to a frame of reference or relative to another object.

Typical systems allow users to interact with AR wearable devices to place virtual objects by performing various hand gestures or physically touching buttons on the AR wearable devices. The detection of hand gestures to place virtual objects consumes a great deal of resources and is also not always accurate. This results in unrealistic interaction and placement of the virtual objects and can force a user to repeat the hand gestures. The hand gestures again need to be processed which again consumes system resources. The repeated processing of hand gestures to place a virtual object in a real-world environment can end up reducing the battery life and slows down the operation of the AR wearable device which detracts from the overall use and enjoyment of the AR wearable device. In some cases, physical buttons can be selected to place virtual objects in a real-world environment. However, the selection of the physical buttons also does not inform the system on the exact location and placement of the virtual objects which also consumes system resources and takes away from the use and enjoyment of the AR wearable device. Such typical systems do not provide a means to seamlessly connect between virtual objects and real-world objects that are viewed through the AR wearable devices.

The disclosed system and methods include operations for providing an AR wearable device (e.g., smart eyeglasses or electronic eyeglasses) that enables a user to seamlessly interact with virtual objects in a real-world environment. Specifically, the disclosed techniques provide a visual indicator of a target location within a real-world environment. The disclosed techniques can receive verbal or voice input from a user and process the voice input to determine a command to perform. The disclosed techniques can determine that the command represents a particular virtual object. In response, the disclosed techniques perform an operation (e.g., placement, movement, modification, retrieve additional information) associated with the particular virtual object relative to the target location within the real-world environment that corresponds to a position of the visual indicator. The available types of operations can be presented as hints on the AR wearable device. The hints can textually inform a user about the keywords or commands to include verbal input to perform a particular desired operation. The hints can be presented alongside a real-world or virtual object that is overlapped or overlaid by the visual indicator.

For example, a verbal command can be received to add a particular type of virtual object to the real-world environment. In response, the disclosed techniques search for and retrieve the described particular type of virtual object (identified by the verbal command) and present the particular virtual object at a location corresponding to the current position of the visual indicator. In some examples, the disclosed techniques can provide a temporary representation (e.g., a partially transparent representation of the virtual object, ghost or outline of the virtual object) of the particular type of virtual object and detect movement of the AR wearable device. As the AR wearable device is moved around the real-world environment, the temporary representation is also moved until a verbal command to place the temporary representation at the current position. In response to receiving the verbal command to place the temporary representation at the current position, the disclosed techniques replace the temporary representation with the corresponding virtual object (e.g., opaque representation of the virtual object). The disclosed techniques can receive verbal commands to move or remove a virtual object that overlaps a current position of the visual indicator and, in response, the disclosed techniques can move the virtual object to a new location in a similar manner or remove the virtual object.

FIG. 1 is perspective view of an AR wearable device (e.g., AR eyeglasses or AR glasses 100), in accordance with some examples. The AR glasses 100 can include a frame 132 made from any suitable material such as plastic or metal, including any suitable shape memory alloy. In one or more examples, the frame 132 includes a front piece 134 including a first optical left optical element holder 114 (e.g., a display or lens holder) and a second or right optical element holder 120 connected by a bridge 118. The front piece 134 additionally includes a left end portion 110 and a right end portion 124. A first or left optical element 116 and a second or right optical element 122 can be provided within respective left optical element holder 114 and right optical element holder 120. The optical elements 116 and 122 can be tinted (where a tint layer is placed on top of the lens or glass that makes up the optical elements 116 and 122) or clear (where no tint layer is placed). Each of the right optical element 122 and the left optical element 116 can be a lens, a display, a display assembly or a combination of the foregoing. Any of the display assemblies disclosed herein can be provided in the AR glasses 100.

The frame 132 additionally includes a left arm or temple piece 136 and a right arm or temple piece 138 coupled to the respective left end portion 110 and the right end portion 124 of the front piece 134 by any suitable means such as a hinge (not shown), so as to be coupled to the front piece 134, or rigidly or fixably secured to the front piece 134 so as to be integral with the front piece 134. In one or more implementations, each of the temple piece 136 and the temple piece 138 includes a first portion 108 that is coupled to the respective left end portion 110 or right end portion 124 of the front piece 134 and any suitable second portion 126 for coupling to the ear of the user. In one example, the front piece 134 can be formed from a single piece of material, so as to have a unitary or integral construction. In one example, such as illustrated in FIG. 1, the entire frame 132 can be formed from a single piece of material so as to have a unitary or integral construction.

The AR glasses 100 can include a computing device, such as a computer 128, which can be of any suitable type so as to be carried by the frame 132 and, in one or more examples, of a suitable size and shape, so as to be at least partially disposed in one of the temple piece 136 and the temple piece 138. In one or more examples, as illustrated in FIG. 1, the computer 128 is sized and shaped similar to the size and shape of one of the temple piece 138 (e.g., or the temple piece 136), and is thus disposed almost entirely if not entirely within the structure and confines of such temple piece 138. In one or more examples, the computer 128 is disposed in both of the temple piece 136 and the temple piece 138. The computer 128 can include one or more processors with memory, wireless communication circuitry, and a power source. As discussed below, the computer 128 comprises low-power circuitry, high-speed circuitry, and a display processor. Various other examples may include these elements in different configurations or integrated together in different ways. Additional details of aspects of computer 128 may be implemented as illustrated by the wearable device 210 discussed below. In some aspects, the computer 128 implements a DLP controller, discussed below.

The computer 128 additionally includes a battery 106 or other suitable portable power supply. In one example, the battery 106 is disposed in one of the temple piece 136 or the temple piece 138. In the AR glasses 100 shown in FIG. 1, the battery 106 is shown as being disposed in left temple piece 136 and electrically coupled using the connection 130 to the remainder of the computer 128 disposed in the right temple piece 138. The AR glasses 100 can include a connector or port (not shown) suitable for charging the battery 106 accessible from the outside of frame 132, a wireless receiver, transmitter, or transceiver (not shown) or a combination of such devices.

In one or more implementations, the AR glasses 100 include cameras 102. Although two cameras are depicted, other examples contemplate the use of a single or additional (i.e., more than two) cameras. In one or more examples, the glasses 100 include any number of input sensors (e.g., one or more ambient light sensors) or peripheral devices in addition to the cameras 102. The front piece 134 is provided with an outward facing, forward-facing or front or outer surface 112 that faces forward or away from the user when the glasses 100 are mounted on the face of the user, and an opposite inward-facing, rearward-facing or rear or inner surface 104 that faces the face of the user when the glasses 100 are mounted on the face of the user. Such sensors can include inwardly-facing video sensors or digital imaging modules such as cameras that can be mounted on or provided within the inner surface 104 of the front piece 134 or elsewhere on the frame 132 so as to be facing the user, and outwardly-facing video sensors or digital imaging modules such as the cameras 102 that can be mounted on or provided with the outer surface 112 of the front piece 134 or elsewhere on the frame 132 so as to be facing away from the user. Such sensors, peripheral devices or peripherals can additionally include biometric sensors, location sensors, ambient light sensors, thermal temperature sensors, or any other such sensors.

Figure 2:
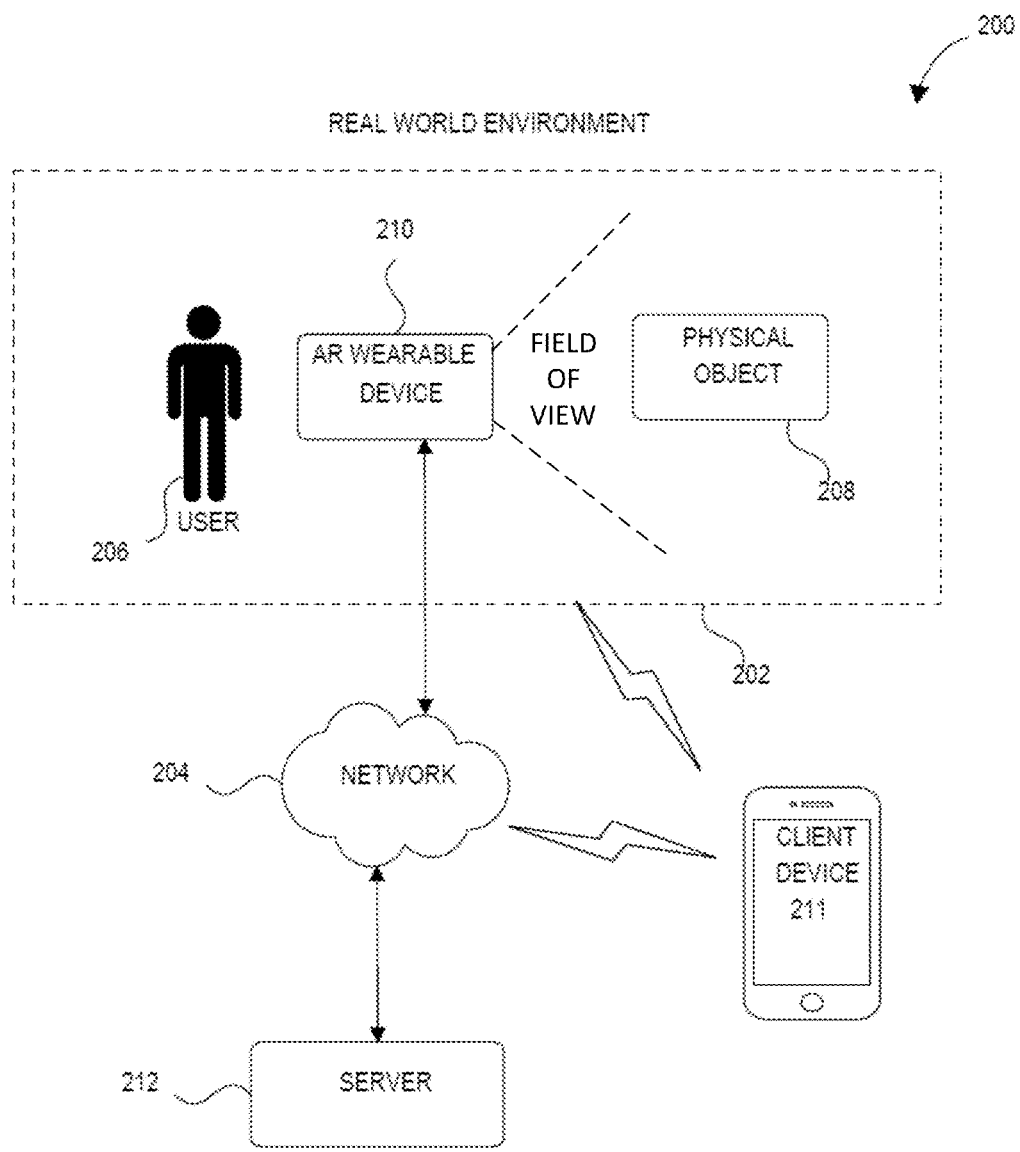
FIG. 2 is a block diagram illustrating a network environment for operating an Augmented Reality (AR) wearable device in accordance with some examples.

FIG. 2 is a network diagram illustrating a network environment 200 suitable for operating an AR wearable device 210, according to some examples. The network environment 200 includes an AR wearable device 210, a client device 211, and a server 212, communicatively coupled to each other directly or via a network 204. The AR wearable device 210 and the server 212 may each be implemented in a computer system, in whole or in part, as described below with respect to FIGS. 8 and 9. The server 212 may be part of a network-based system. For example, the network-based system may be or include a cloud-based server system that provides additional information, such as virtual content (e.g., images of two-dimensional (2D) or three-dimensional (3D) models of virtual objects) to the AR wearable device 210.

The client device 211 may be a smartphone, tablet, phablet, laptop computer, access point, or any other such device capable of connecting with the wearable device 210 using both a low-power wireless connection and a high-speed wireless connection. The client device 211 is connected to the server 212 and the network 204. The network 204 may include any combination of wired and wireless connections. The server 212 may be one or more computing devices as part of a service or network computing system. The client device 211 and any elements of the server 212 and network 204 may be implemented using details of the software architecture 704 or the machine 800 described in FIGS. 8 and 9. The client device 211 can provide one or more images for display to the AR wearable device 210.

In some examples, the client device 211 implements a speech recognition or processing engine. The AR wearable device 210 can implement a microphone and can detect voice input from a user or person. The AR wearable device 210 can record or transmit the detected voice input to the client device 211 (or the server 212) in real-time or in a time-shifted manner. The client device 211 (or the server 212) can process the voice input to detect one or more words and a context of the voice input. Based on the one or more words and the context, the client device 211 (or the server 212) can select a virtual object and/or one or more operations. The virtual object and/or the one or more operations can be transmitted to the AR wearable device 210 which can then control presentation of the virtual object on the AR wearable device 210. In some cases, the AR wearable device 210 itself implements in whole or in part the speech recognition or processing engine. In such implementations, the AR wearable device 210 locally processes the voice input to detect one or more words and a context of the voice input and select a virtual object and/or one or more operations.

A user 206 operates the AR wearable device 210. The user 206 may be a human user (e.g., a human being), a machine user (e.g., a computer configured by a software program to interact with the AR wearable device 210), or any suitable combination thereof (e.g., a human assisted by a machine or a machine supervised by a human). The user 206 is not part of the network environment 200 but is associated with the AR wearable device 210.

The AR wearable device 210 may be a computing device with a display such as a smartphone, a tablet computer, or a wearable computing device (e.g., AR glasses or head-mounted display device). The computing device may be hand-held or may be removable mounted to a head of the user 206. In some examples, the display may be a screen that displays what is captured with a camera of the AR wearable device 210. In some examples, the display of the device may be transparent such as in lenses of wearable computing glasses. In some examples, the display of the AR wearable device 210 may project an image or virtual object within lenses of the AR wearable device 210, such as by using one or more projection elements operated by a digital light processing (DLP) controller.

The user 206 operates an application of the AR wearable device 210, such as using voice input. The application may include an AR application configured to provide the user 206 with an experience triggered by a physical object 208, such as a two-dimensional physical object (e.g., a picture), a three-dimensional physical object (e.g., a statue), a location (e.g., in a facility), or any references (e.g., perceived corners of walls or furniture) in the real-world physical environment. For example, the user 206 may point a camera of the AR wearable device 210 to capture an image of the physical object 208. The image is tracked and recognized locally in the AR wearable device 210 using a local context recognition dataset module of the AR application of the AR wearable device 210. The local context recognition dataset module may include a library of virtual objects associated with real-world physical objects or references. The AR application then generates additional information corresponding to the image (e.g., a three-dimensional model) and presents this additional information, as one or more images, in a display of the AR wearable device 210 in response to identifying the recognized image. If the captured image is not recognized locally at the AR wearable device 210, the AR wearable device 210 downloads additional information (e.g., the three-dimensional model) corresponding to the captured image, from a database of the server 212 over the network 204 or from the client device 211.

In some examples, the server 212 may be used to detect and identify the physical object 208 based on sensor data (e.g., image and depth data) from the AR wearable device 210, determine a pose of the AR wearable device 210 and the physical object 208 based on the sensor data. The server 212 can also generate a virtual object based on the pose of the AR wearable device 210 and the physical object 208. The server 212 communicates the virtual object to the AR wearable device 210. The object recognition, tracking, and AR rendering can be performed on either the AR wearable device 210, the server 212, or a combination between the AR wearable device 210 and the server 212.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 204 may be any network that enables communication between or among machines (e.g., server 212), databases, and devices (e.g., AR wearable device 210). Accordingly, the network 204 may be a wired network, a wireless network (e.g., a mobile, BLUETOOTH, short-range network, or long-range network, or cellular network), or any suitable combination thereof. The network 204 may include one or more portions that constitute a private network, a public network (e.g., the Internet), or any suitable combination thereof.

Figure 3:
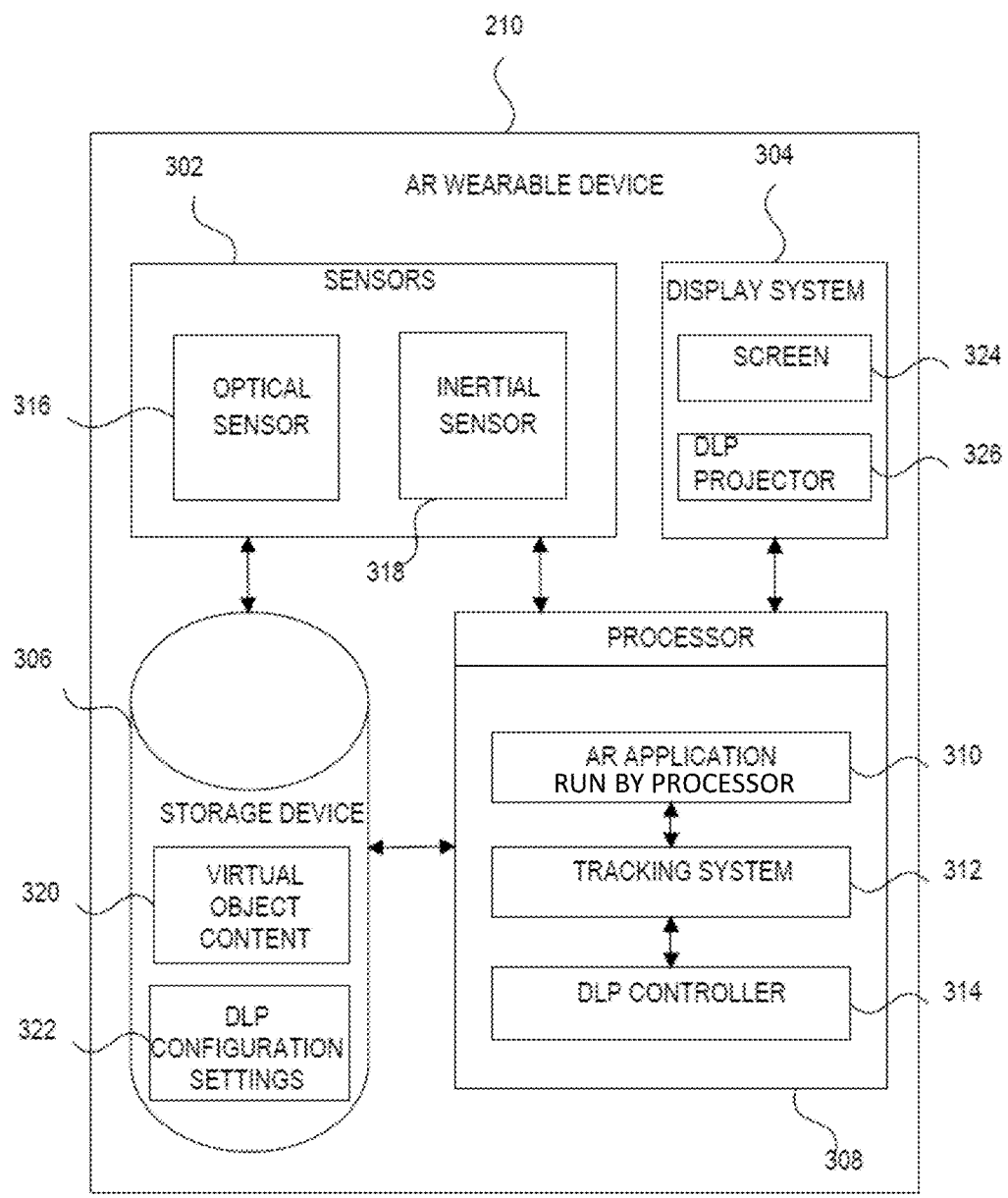
FIG. 3 is a block diagram illustrating an AR wearable device in accordance with some examples.

FIG. 3 is a block diagram illustrating modules (e.g., components) of the AR wearable device 210, according to some examples. The modules and/or components include one or more processors, programmable devices and/or dedicated hardware processing circuitries that are configured to enable a user to seamlessly interact with virtual objects in a real-world environment. Namely, the modules and/or components can include instructions for the one or more processors, programmable devices and/or dedicated hardware processing circuitries to perform operations including providing a visual indicator of a target location within a real-world environment; receiving verbal or voice input from a user and process the voice input to determine a command to perform; determining that the command represents a particular virtual object; and in response performing an operation (e.g., placement, movement, modification, retrieve additional information) associated with the particular virtual object relative to the target location within the real-world environment that corresponds to a position of the visual indicator. The available types of operations can be presented as hints on the AR wearable device. The hints can textually inform a user about the keywords or commands to include verbal input to perform a particular desired operation. The hints can be presented alongside a real-world or virtual object that is overlapped or overlaid by the visual indicator. The AR wearable device 210 also includes sensors 302, a display system 304, a processor 308, and a storage device 306. Examples of AR wearable device 210 include a wearable computing device, AR glasses, AR eyeglasses, smart glasses, smart sunglasses, AR contact lenses, a desktop computer, a vehicle computer, a tablet computer, a navigational device, a portable media device, or a smart phone.

The sensors 302 include, for example, an optical sensor 316 (e.g., camera such as a color camera, a thermal camera, a depth sensor and one or multiple grayscales, global shutter tracking cameras) and an inertial sensor 318 (e.g., gyroscope, accelerometer). Other examples of sensors 302 include a proximity or location sensor (e.g., near field communication, GPS, Bluetooth, Wi-Fi), ambient light sensor, a thermal temperature sensor, an audio sensor (e.g., a microphone), or any suitable combination thereof. It is noted that the sensors 302 described herein are for illustration purposes and the sensors 302 are thus not limited to the ones described above.

The display system 304 includes a screen 324 and a DLP projector 326. The DLP projector 326 includes one or more projection elements (LEDs) that project an image of a virtual object on the screen 324. In some examples, the screen 324 may be transparent or semi-opaque so that the user 206 can see through the screen 324 (in AR use case) to view a real-world environment. In such cases, the virtual object projected on the screen 324 appears as though it is part of the real-world environment seen through the screen 324. The DLP projector 326 is configured to operate with a predictable color sequence, a single RGB color cycle per frame, and a shorter pixel persistence.

The processor 308 can be used to implement and/or run various subcomponents including an AR application 310, a tracking system 312, and a DLP controller 314. The AR application 310 detects and identifies a physical real-world environment or the physical object 208 or virtual object using computer vision. The AR application 310 (which can be partially implemented by the client device 211) retrieves a virtual object (e.g., 3D object model) based on the identified physical object 208 or physical environment. The AR application 310 renders the virtual object in the display system 304. For an AR application, the AR application 310 includes a local rendering engine that generates a visualization of a virtual object overlaid (e.g., superimposed upon, or otherwise displayed in tandem with) on an image of the physical object 208 captured by the optical sensor 316. A visualization of the virtual object may be manipulated by adjusting a position of the physical object 208 (e.g., its physical location, orientation, or both) relative to the optical sensor 316. Similarly, the visualization of the virtual object may be manipulated by adjusting a pose of the AR wearable device 210 relative to the physical object 208.

The AR application 310 is configured to respond to verbal or voice input received from a user or person. As described below in connection with FIGS. 4A-C, 5A-B, 6 and 7, based on the verbal or voice input received from the user or person, the AR application can modify placement of one or more virtual objects within a real-world environment and/or removal of such virtual objects within the real-world environment. Specifically, the AR application 310 can present a visual indicator that includes a cursor at a static visible position. The AR application 310 can detect voice input from a user and can perform one or more operations associated with one or more virtual objects associated with a real-world position or virtual position corresponding to a location of the visual indicator. The operations can include providing additional information about one or more objects identified by the cursor, adding one or more virtual objects identified by the voice input and/or corresponding to selections made by the cursor to the position of the cursor, movement of one or more virtual objects at the cursor position to another real-world location, and so forth.

The tracking system 312 tracks the pose (e.g., position and orientation) of the AR wearable device 210 relative to the real world environment 202 using optical sensors (e.g., depth-enabled 3D camera, image camera), inertia sensors (e.g., gyroscope, accelerometer), wireless sensors (Bluetooth, Wi-Fi), GPS sensor, and/or audio sensor to determine the location of the AR wearable device 210 within the real world environment 202. The tracking system 312 includes, for example, accesses inertial sensor data from the inertial sensor 318, optical sensor data from the optical sensor 316, and determines its pose based on the combined inertial sensor data and the optical sensor data. In some examples, the tracking system 312 determines a pose (e.g., location, position, orientation) of the AR wearable device 210 relative to a frame of reference (e.g., real world environment 202). In some examples, the tracking system 312 includes a visual odometry system that estimates the pose of the AR wearable device 210 based on 3D maps of feature points from the inertial sensor data and the optical sensor data.

The DLP controller 314 communicates data signals to the DLP projector 326 to project the virtual content (including one or more images and one or more virtual objects) onto the screen 324 (e.g., transparent display). The DLP controller 314 includes a hardware that converts signals from the AR application 310 to display signals for the DLP projector 326. In some examples, the DLP controller 314 is part of the processor 308. In some examples, the DLP controller 314 is part of the DLP projector 326.

The storage device 306 stores virtual object content 320 and DLP configuration settings 322. The virtual object content 320 includes, for example, a database of visual references (e.g., images) and corresponding experiences (e.g., 3D virtual objects, interactive features of the 3D virtual objects). In some examples, the storage device 306 includes a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images. The core set of images may include a limited number of images identified by the server 212. For example, the core set of images may include the images depicting covers of the ten most viewed physical objects and their corresponding experiences (e.g., virtual objects that represent the ten most viewed physical objects). In some examples, the server 212 may generate the first set of images based on the most popular or often scanned images received at the server 212. Thus, the primary content dataset does not depend on physical objects or images obtained by the optical sensor 316.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

Figure 4A:
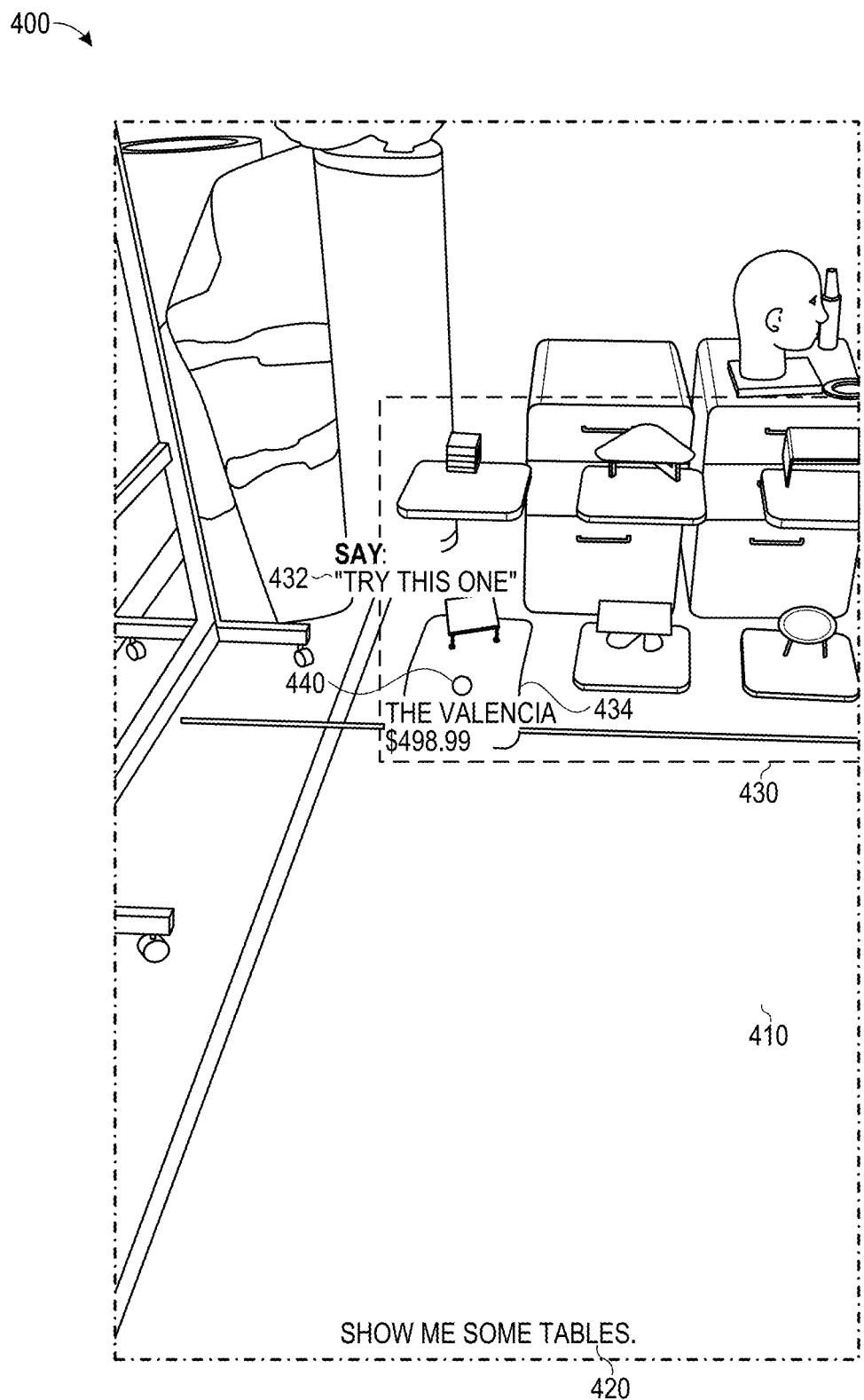
FIGS. 4A-C are example inputs and outputs of the AR wearable device in accordance with some examples.
Figure 4B:
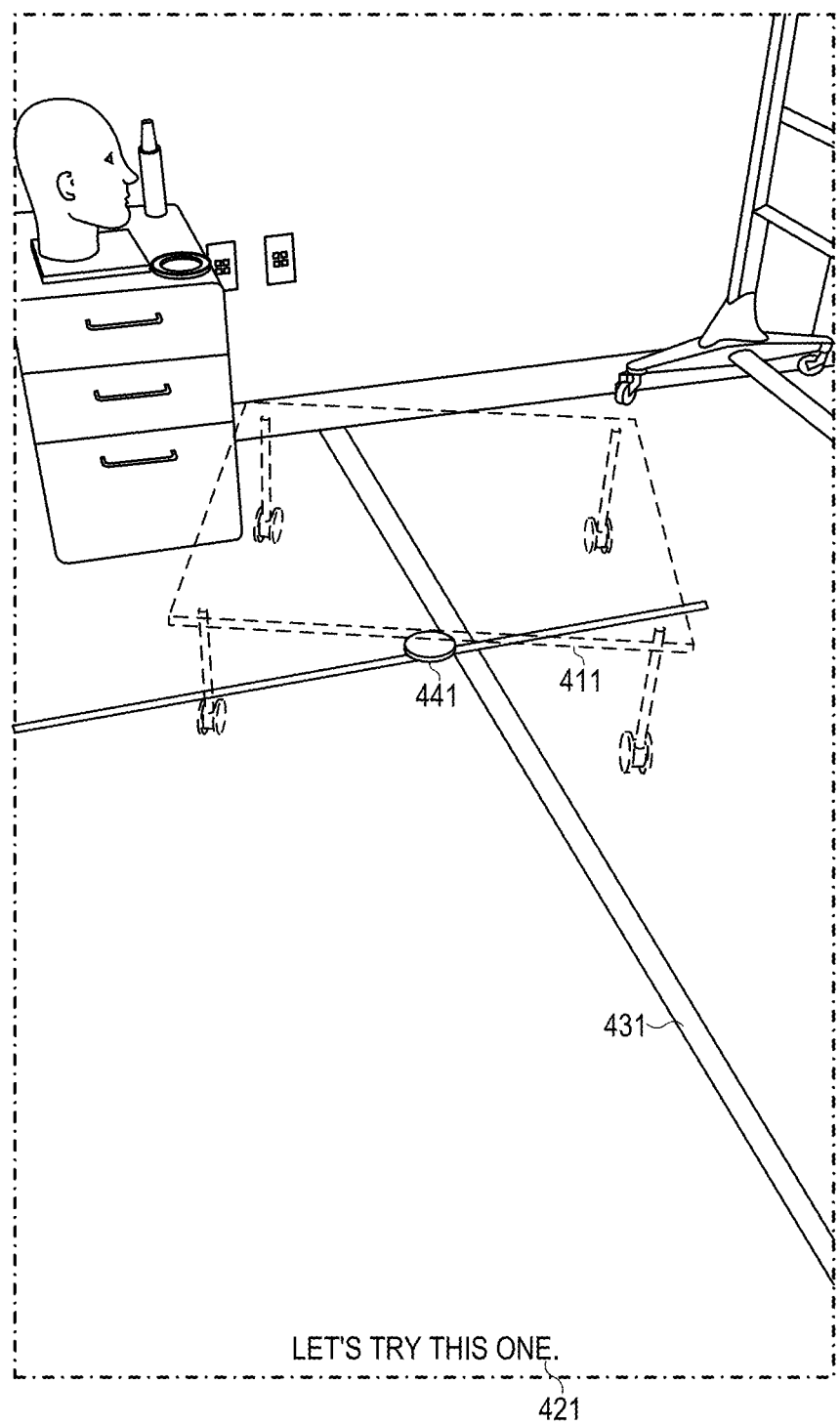
Figure 4C:
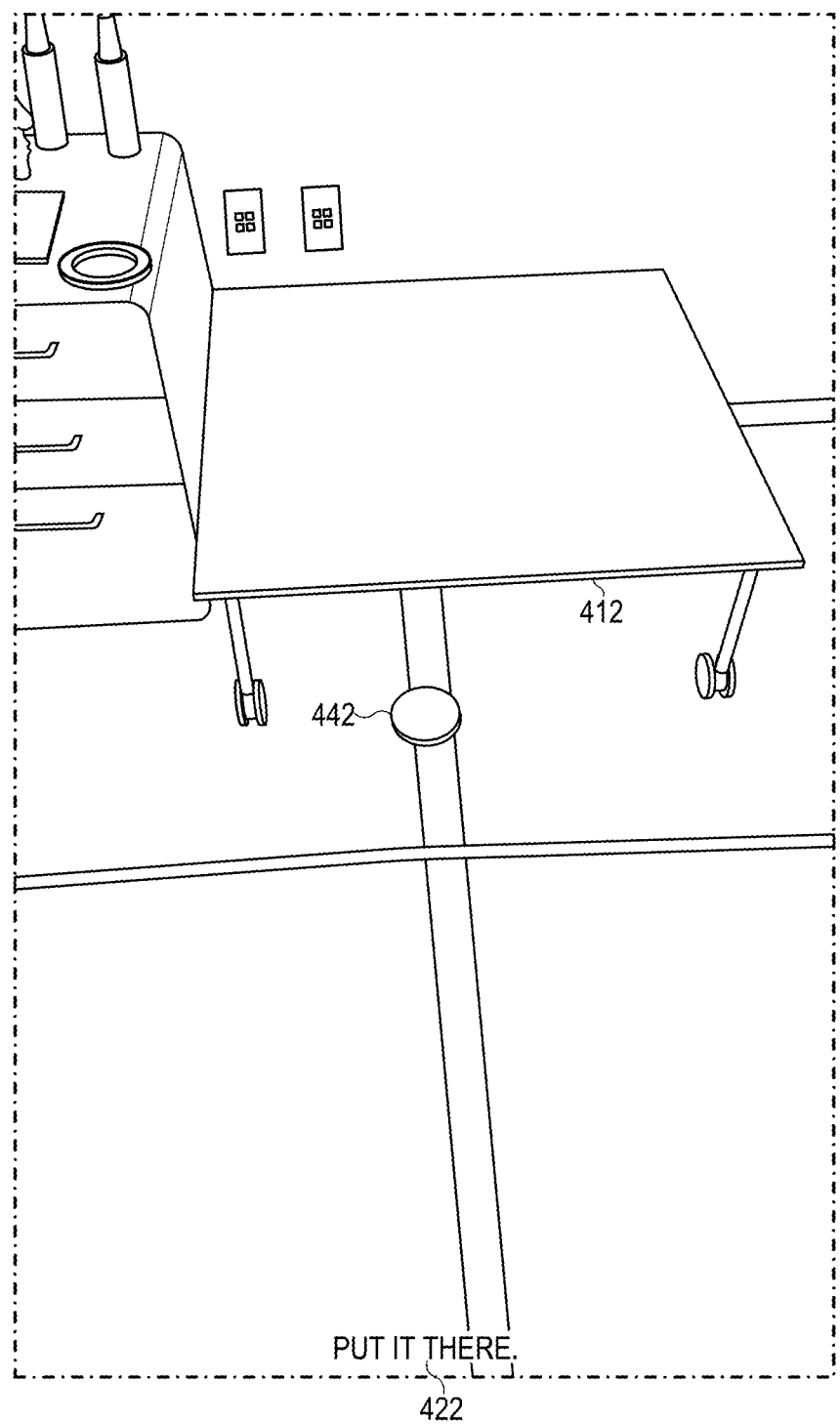

FIGS. 4A-C are example inputs and outputs of the AR wearable device in accordance with some examples. As shown in FIG. 4A, a first portion of a real-world environment 400 is being viewed through lenses of the AR wearable device 210. The first portion of a real-world environment 400 includes one or more real-world objects 410. The AR wearable device 210 presents or overlays on top of the first portion of the real-world environment 400 a visual indicator 440 that represents or includes a cursor. This visual indicator 440 can be displayed, for example, in the center of view of the first portion of the real-world environment 400 and can remain positioned at that same center of view as the AR wearable device 210 is moved around to view other portions of the real-world environment. In some examples, the visual indicator 440 is displayed in a top right corner and remains statically positioned at the location as the AR wearable device 210 is moved around.

The AR wearable device 210 can detect voice input via a microphone of the AR wearable device 210. In response to detecting voice input, the AR wearable device 210 processes the voice input, such as using a locally-implemented or remotely implemented, speech recognition engine. The output of the speech recognition engine includes one or more words 420 corresponding to the voice input. For example, the one or more words can include the statement "show me some tables." The AR wearable device 210 processes the one or more words to determine a command or operation to perform. In this case, the AR wearable device 210 determined that the operation or command corresponds to a list of a particular type of object (e.g., tables). In some cases, the one or more words include a detailed description of the object (e.g., a shape, dimension, color, and/or style). The AR wearable device 210 retrieves a list of objects that include or are associated with properties that match the detailed description included in the one or more words.

The AR wearable device 210 can present a virtual menu 430 that includes one or more objects that correspond to the particular type of object specified by the voice input. For example, the virtual menu 430 includes six different types of tables that are arranged in a two by three matrix or other suitable visual or presentation arrangement. Each object in the virtual menu 430 visually represents a given virtual object (e.g., a different type of virtual table). The AR wearable device 210 can determine that the AR wearable device 210 is being moved up/down or side to side. As the AR wearable device 210 is being moved around, the AR wearable device 210 moves the visual indicator 440 to maintain its position at a center of the view. For example, the AR wearable device 210 can be positioned in a first position or orientation in which case the visual indicator 440 overlaps a first virtual object 434 of the one or more objects included in the virtual menu 430.

In response to detecting that the visual indicator 440 has been moved to overlap or correspond to the position of the first virtual object 434, the AR wearable device 210 can animate the first virtual object 434 (e.g., present the first virtual object 434 as bouncing up and down). This indicates to the user that the first virtual object 434 is being identified by the cursor corresponding to the visual indicator 440. As the AR wearable device 210 is moved up relative to the real-world environment that is within view, the visual indicator 440 is moved vertically and away from the first virtual object 434. When the AR wearable device 210 is moved up enough for the visual indicator 440 to overlap a second virtual object that is positioned above the first virtual object 434, the AR wearable device 210 animates the second virtual object to indicate it as a target of selection.

In some examples, the AR wearable device 210 can present a hint 432 for a voice command that a user can speak in order to select the virtual object being identified by the visual indicator 440. For example, when the visual indicator 440 is positioned on top of the first virtual object 434, the AR wearable device 210 can present a message that includes a hint 432 indicating "say 'try this one'". This alerts the user that speaking the phrase "try this one" causes the AR wearable device 210 to retrieve the virtual object identified by the first virtual object 434.

For example, as shown in FIG. 4B, the AR wearable device 210 can receive verbal input 421 from the user speaking the phrase "let's try this one". The AR wearable device 210 processes the phrase to detect words of the phrase matching the command "try this one". The AR wearable device 210 determines that the visual indicator 440 was positioned over the first virtual object 434 when the verbal input 421 was received. In such cases, the AR wearable device 210 retrieves the virtual object (e.g., a virtual table) corresponding to the first virtual object 434.

In some examples, the AR wearable device 210 initially presents the retrieved virtual object with a first visual attribute. For example, the AR wearable device 210 can present a ghost representation 411 of the virtual object (e.g., a virtual table) corresponding to the first virtual object 434. The ghost representation 411 can include an outline of the virtual object (e.g., a virtual table) corresponding to the first virtual object 434. In some examples, the ghost representation 411 includes the shape of the virtual object (e.g., a virtual table) corresponding to the first virtual object 434 that is partially transparent. This allows the user to visualize how the virtual object (e.g., a virtual table) corresponding to the first virtual object 434 looks in a certain real-world position while also seeing what is currently placed at the real-world position overlapped by the ghost representation 411.

The AR wearable device 210 maintains the presentation of the ghost representation 411 statically positioned (e.g., in a center of view) together with a statically positioned visual indicator 441. As the AR wearable device 210 is turned or moved around by a certain amount in a certain direction, the AR wearable device 210 also updates the display position of the ghost representation 411 to track movement of the AR wearable device 210. This way, the AR wearable device 210 can move the ghost representation 411 around the real-world environment. For example, the ghost representation 411 can initially be presented in the first portion of the real-world environment 400 and over one or more real-world objects 410. The AR wearable device 210 can detect movement, such as the head turning towards the right where a second portion of the real-world environment 401 is visible through the lenses of the AR wearable device 210. In response, the AR wearable device 210 updates the presentation position of the ghost representation 411 to be within the view of the second portion of the real-world environment 401 and over other real-world objects 431.

As shown in FIG. 4C, the AR wearable device 210 can receive verbal input 422 from the user speaking the phrase "put it there" (or some other phrase with a command to add the virtual object to the real-world environment) while a third portion of the real-world environment 402 is being viewed through the lenses of the AR wearable device 210. In response, the AR wearable device 210 determines that the visual indicator 441 and the ghost representation 411 were displayed at a particular real-world position. In such cases, the AR wearable device 210 displays the virtual object with a second visual attribute. Namely, the AR wearable device 210 modifies the display attribute of the virtual object from the first visual attribute (e.g., the ghost representation 411) to a second visual attribute (e.g., an opaque representation in which no portion of the real-world environment or other objects can be seen through the virtual object). This indicates to the user that the virtual object is no longer tracking movement of the AR wearable device 210 and is anchored at the particular real-world position corresponding to where the visual indicator 441 and the ghost representation 411 were displayed. For example, as shown in FIG. 4C, the virtual object 412 (e.g., a virtual table) corresponding to the first virtual object 434 that was selected from the virtual menu 430 is opaque (e.g., displayed with a second visual attribute). Now, when the AR wearable device 210 is moved around (e.g., up/down or left/right), the virtual object 412 remains positioned where it was placed so that when the AR wearable device 210 is turned or moved (e.g., 180 degrees), the virtual object 412 is removed from view and is no longer visible.

In some examples, the AR wearable device 210 can receive a verbal command to move a particular virtual object to a new location. For example, the AR wearable device 210 receives verbal input 421 from the user speaking the phrase "move the object". The AR wearable device 210 processes the phrase to detect words of the phrase matching the command "move". In response, the AR wearable device 210 determines that the visual indicator 440 was positioned over the virtual object 412 when the verbal input including the move command was received. In such cases, the AR wearable device 210 modifies the visual attribute of virtual object 412 from the second visual attribute (e.g., the opaque display) back to the first visual attribute (e.g., the ghost representation 411). This informs the user that the virtual object 412 will now be moved in a way that tracks movement of the AR wearable device 210. This allows the user to visualize how the virtual object 412 looks in different real-world positions.

As discussed with respect to FIG. 4B, the AR wearable device 210 maintains the presentation of the ghost representation 411 statically positioned (e.g., in a center of view) together with a statically positioned visual indicator 441. As the AR wearable device 210 is turned or moved around by a certain amount in a certain direction, the AR wearable device 210 also updates the display position of the ghost representation 411 to track movement of the AR wearable device 210. This way, the AR wearable device 210 can move the ghost representation 411 around the real-world environment. As shown in FIG. 4C, the AR wearable device 210 receives verbal input 422 from the user speaking the phrase "put it there". In response, the AR wearable device 210 determines that the visual indicator 441 and the ghost representation 411 were displayed at a new real-world position. In such cases, the AR wearable device 210 displays the virtual object with the second visual attribute to keep the virtual object statically placed within the real-world environment at the new real-world position.

In some examples, the AR wearable device 210 determines an approximate or estimated distance between a real-world position associated with or overlapped by the visual indicator 441 and the AR wearable device 210. The AR wearable device 210 can adjust the size of the ghost representation 411 and/or the virtual object 412 based on the approximate or estimated distance. For example, if the visual indicator 441 overlaps a real-world position that is far away (is at a first distance) from the AR wearable device 210 (e.g., the user is looking at a wall), the AR wearable device 210 adjusts the size of the ghost representation 411 and/or the virtual object 412 to be a first size. If the AR wearable device 210 is moved down to face the floor to cause the visual indicator 441 to overlaps a different real-world position that is closer (is at a second distance that is shorter than the first distance) from the AR wearable device 210 (e.g., the user is looking at a floor), the AR wearable device 210 adjusts the size of the ghost representation 411 and/or the virtual object 412 to be a second size that is larger than the first size.

Figure 5A:
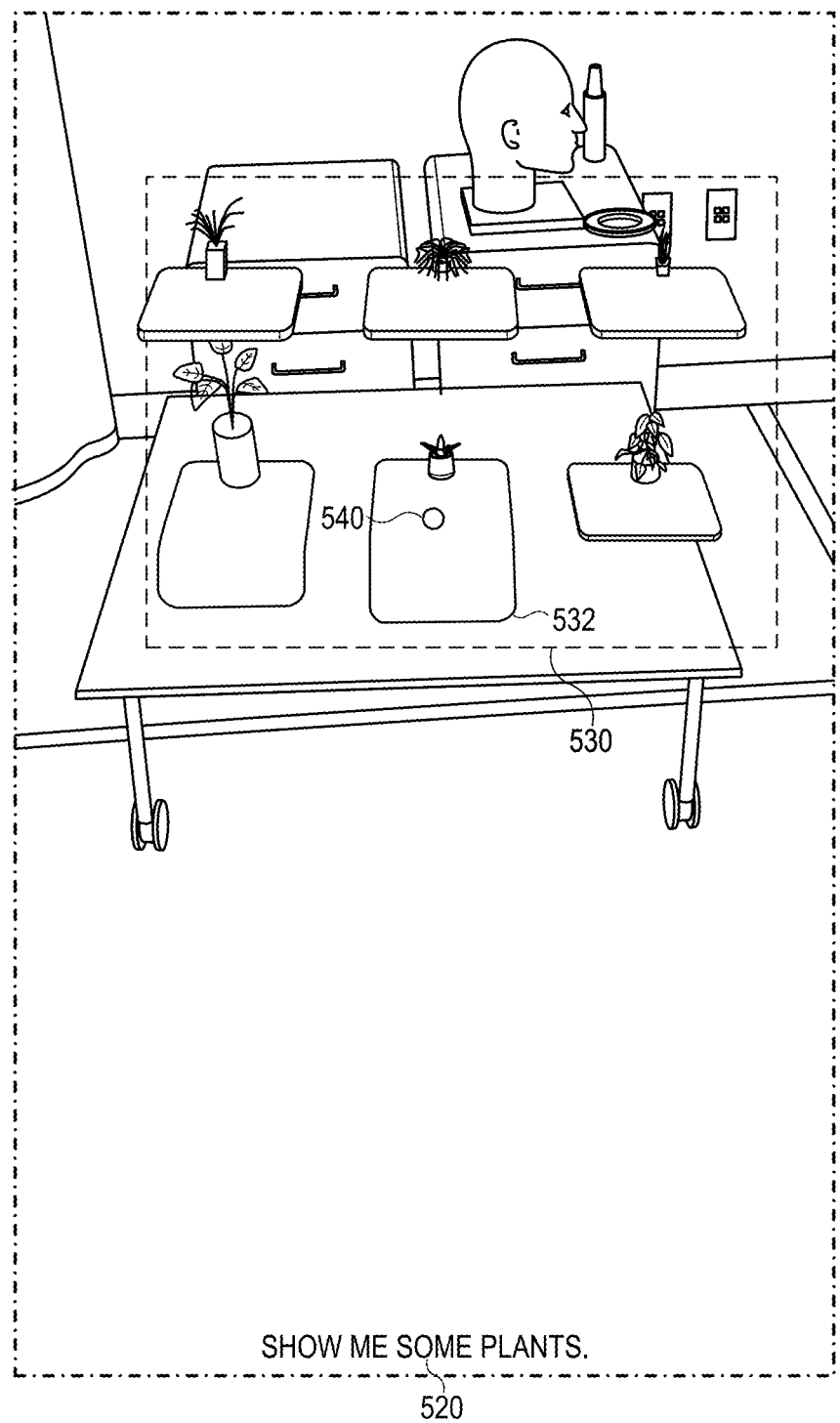
FIGS. 5A and 5B are example inputs and outputs of the AR wearable device in accordance with some examples.

In some examples, AR wearable device 210 enables a user to add one or more virtual objects on top of a surface of a real-world or another virtual object. Specifically, as shown in FIG. 5A, the virtual object 412 is displayed within a real-world environment 500 viewed through the lenses of the AR wearable device 210. The AR wearable device 210 can detect voice input via a microphone of the AR wearable device 210. For example, the verbal input can include the statement "show me some plants." The AR wearable device 210 processes the one or more words of the verbal input to determine a command or operation to perform. In this case, the AR wearable device 210 determines that the operation or command corresponds to a list of a particular type of object (e.g., plants). The AR wearable device 210 then retrieves a list of objects that include or are associated with properties that match the detailed description included in the one or more words of the verbal input.

The AR wearable device 210 can present a virtual menu 530 that includes one or more objects that correspond to the particular type of object specified by the voice input. For example, the virtual menu 530 includes six different types of plants that are arranged in a two by three matrix or other suitable visual or presentation arrangement. The virtual menu 530 is displayed on top of a target object, such as a virtual surface of the virtual object 412. Each object in the virtual menu 430 visually represents a miniaturized version of a given virtual object (e.g., a different type of virtual plant). The AR wearable device 210 can determine that the AR wearable device 210 is being moved up/down or side to side. As the AR wearable device 210 is being moved around, the AR wearable device 210 moves the visual indicator 540 to maintain its position at a center of the view. For example, the AR wearable device 210 can be positioned in a first position or orientation in which case the visual indicator 540 overlaps a given virtual object 532 of the one or more objects included in the virtual menu 530.

In response to detecting that the visual indicator 532 has been moved to overlap or correspond to the position of the first virtual object 532, the AR wearable device 210 animates the given virtual object 532 (e.g., present the given virtual object 532 as bouncing up and down). This indicates to the user that the given virtual object 532 is being identified by the cursor corresponding to the visual indicator 540. As discussed above, the AR wearable device 210 detects a verbal command that indicates a selection operation when the given virtual object 532 is identified by the cursor. In response, the AR wearable device 210 presents a real-world sized virtual object corresponding to the miniaturized version of the given virtual object 532. The real-world sized virtual object can initially be presented with a ghost representation (e.g., a first visual attribute). The real-world sized virtual object can be moved around the real-world environment based on movement tracking of the AR wearable device 210.

Figure 5B:
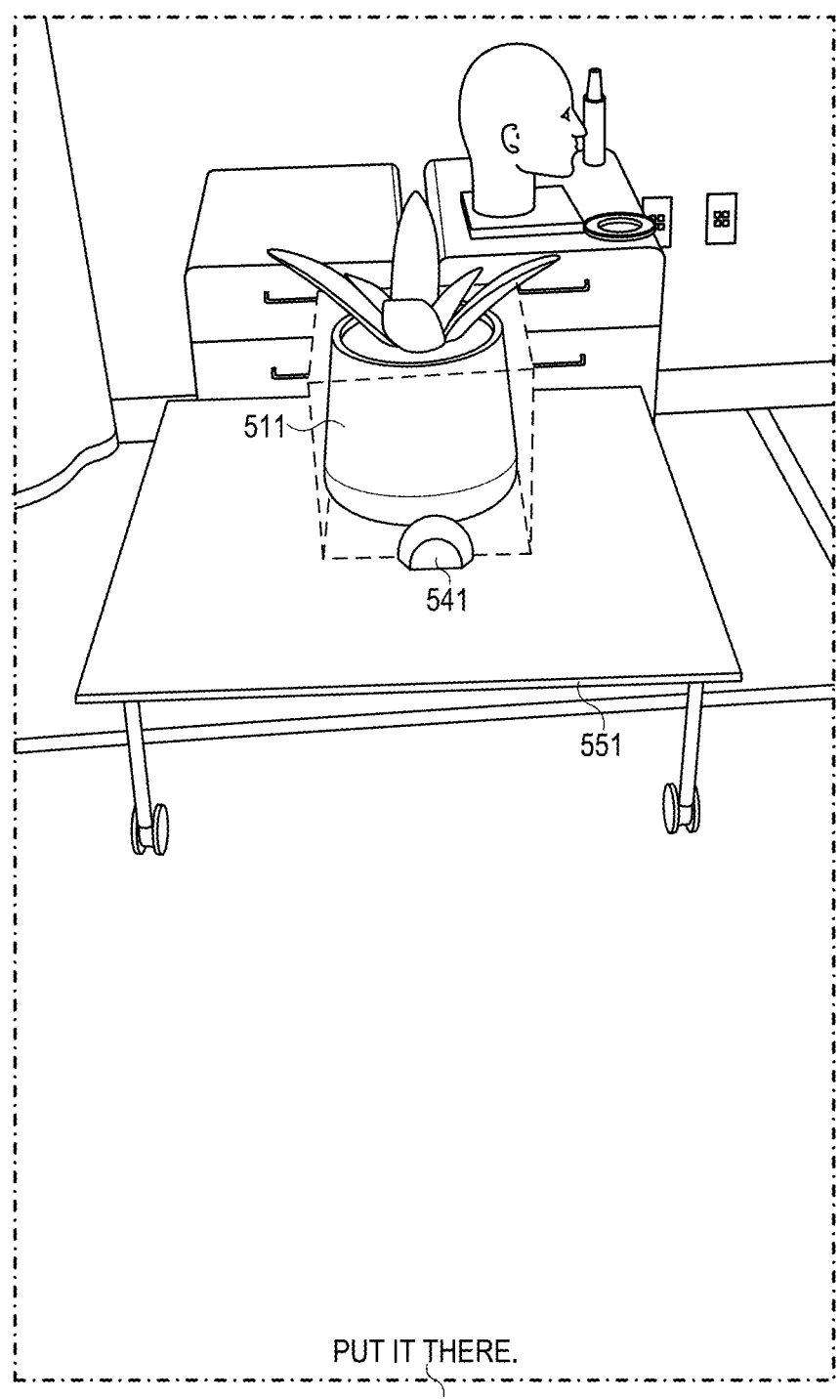

In response to the AR wearable device 210 receiving a verbal command to place the real-world sized virtual object at a current position within the real-world environment, the AR wearable device 210 modifies the visual attribute of the real-world sized virtual object from the first visual attribute to the second visual attribute (e.g., an opaque representation). For example, as shown in FIG. 5B, a verbal command 521 that includes the statement "put it there" is received while a portion of the real-world environment 501 is being viewed through lenses of the AR wearable device 210. In response, the virtual object 511 is placed at a current position identified by the visual indicator 541. In some cases, the AR wearable device 210 determines that the current position overlaps a different virtual object 551 (e.g., a table). In such cases, the AR wearable device 210 orients the virtual object 511 based on an orientation and surface of the different virtual object 551. This generates a display in which the virtual object 511 appears to be placed on top of the different virtual object 551.

In some examples, the AR wearable device 210 can determine that a second object (e.g., a virtual table or real-world table) is currently placed within the real-world environment at the same target position as the current position of the visual indicator 540. The AR wearable device 210 determines whether concurrent presentation of the virtual object 511 and the second object at the same real-world position violates a presentation criterion. In response to determining that the concurrent presentation of the virtual object 511 and the second object at the real-world position satisfies the presentation criterion, the AR wearable device 210 enables placement of the virtual object 511 at the real-world position (e.g., presents the virtual object 511 on top of the virtual table). In response to determining that the concurrent presentation of the virtual object 511 and the second object at the real-world position violates or fails to satisfy the presentation criterion, the AR wearable device 210 modifies a visual attribute of the virtual object 511 to indicate that the presentation criterion is being violated. For example, the virtual object 511 can represent a first type of object (e.g., a television) and the second object at the real-world environment is also of the first type (e.g., is a television). The AR wearable device 210 can determine that concurrent presentation of the virtual object 511 and the second object at the same real-world position violates a presentation criterion in response to determining that the virtual object 511 and the second object at the real-world position of the visual indicator 540 are of the same type or class. Namely, two televisions cannot coexist at the same location. In such cases, the AR wearable device 210 can display the virtual object 511 with a third visual attribute (e.g., in a particular color, such as red) or can maintain the virtual object 511 as a ghost representation. The two objects can coexist at the same location (e.g., the presentation criterion can be satisfied) if they correspond to related types that are different (e.g., a table and an object that can be placed on a table).

In some examples, an orientation of the visual indicator 540 can be adjusted based on an orientation of a surface over which the visual indicator 540 is positioned. For example, as the AR wearable device 210 is moved around, the visual indicator 540 continues to remain positioned at the center and overlaps different real-world or virtual objects. The AR wearable device 210 continuously determines an orientation of a surface of the real-world or virtual objects that are overlapped by the visual indicator 540. The AR wearable device 210 modifies the orientation of the visual indicator 540 to match the orientation of the surface of the real-world or virtual object. In some examples, the AR wearable device 210 modifies a display attribute (e.g., color, style, shape, size, and so forth) of the visual indicator 540 based on a type of the real-world or virtual object overlapped by the visual indicator 540. For example, when the visual indicator 540 overlaps a real-world object, the visual indicator 540 is displayed in a first color. When the AR wearable device 210 is moved to a new position and the visual indicator 540 now overlaps a virtual object placed at the new position within the real-world environment, the visual indicator changes from being displayed in the first color to being displayed in a second color.

Figure 6:
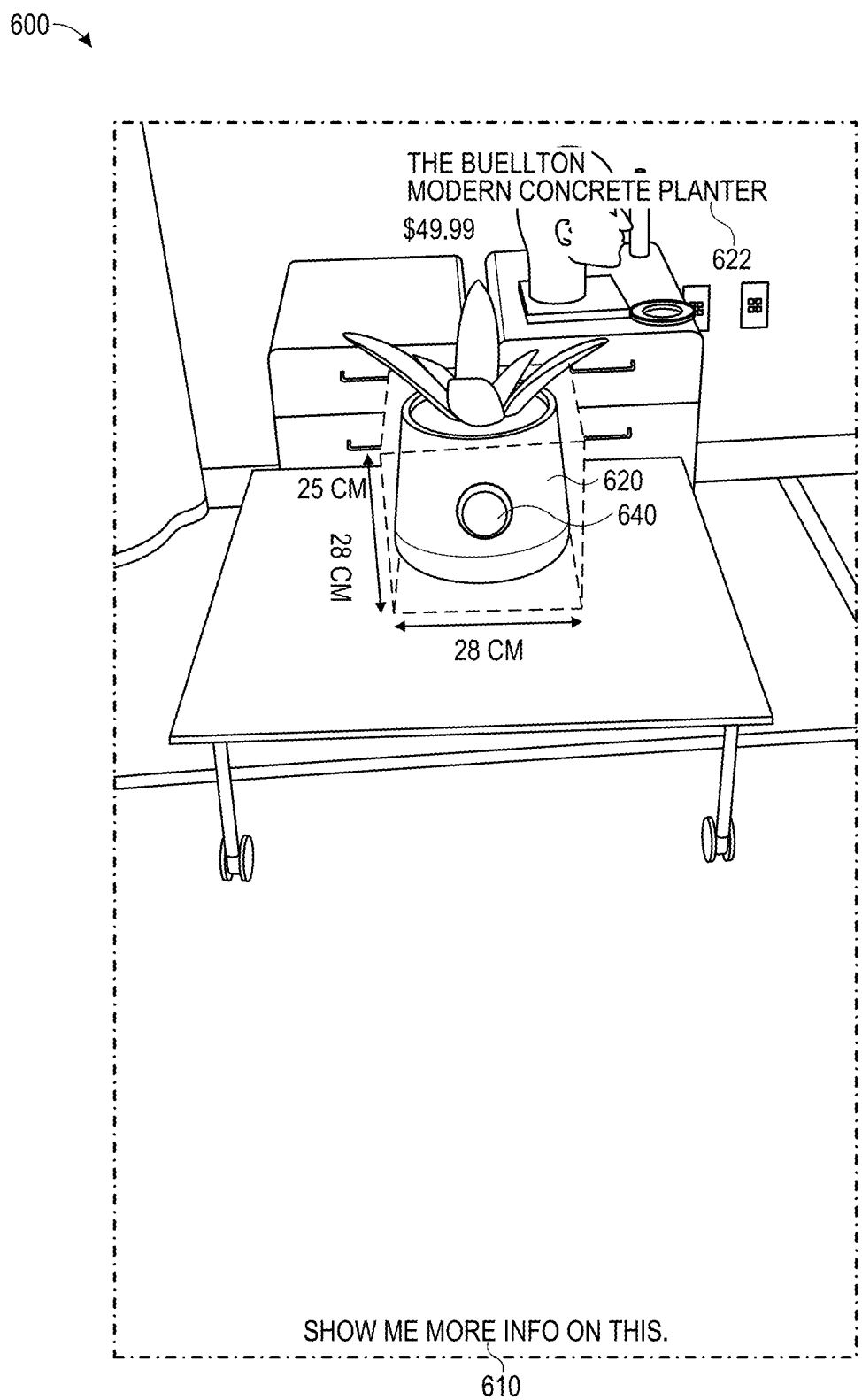
FIG. 6 is an example of inputs and outputs of the AR wearable device in accordance with some examples.

FIG. 6 is an example of inputs and outputs of the AR wearable device in accordance with some examples. For example, the AR wearable device 210 can be pointed towards a given portion of the real-world environment 600. The given portion of the real-world environment 600 can include a target object 620 that was previously placed, such as based on voice or verbal input from the user. The AR wearable device 210 detects that a visual indicator 640 is positioned to overlap the target object 620. Concurrently with detecting that the visual indicator 640 overlaps the target object 620, the AR wearable device 210 can receive verbal or voice input 610 requesting additional information about the object over which the visual indicator 640 is positioned.

In response to receiving the verbal or voice input 610, the AR wearable device 210 obtains an identifier of the target object 620. The AR wearable device 210 searches a local or remote storage for additional information about the virtual object 620. For example, the AR wearable device 210 retrieves at least one of a price, a size, and/or a description of the target object 620. The AR wearable device 210 displays the at least one of a price, a size, and/or a description 622 of the target object 620 in response to retrieving the additional information.

In some cases, the AR wearable device 210 can receive a verbal command to remove a virtual object from the real-world environment. For example, the AR wearable device 210 can be pointed towards a given portion of the real-world environment 600. The given portion of the real-world environment 600 can include the target object 620 that was previously placed, such as based on voice or verbal input from the user. The AR wearable device 210 detects that a visual indicator 640 is positioned to overlap the target object 620. Concurrently with detecting that the visual indicator 640 overlaps the target object 620, the AR wearable device 210 can receive verbal or voice input 610 requesting removal of the target object 620 over which the visual indicator 640 is positioned. In response to receiving the verbal or voice input 610, the AR wearable device 210 deletes the target object 620 from the real-world environment.

Figure 7:
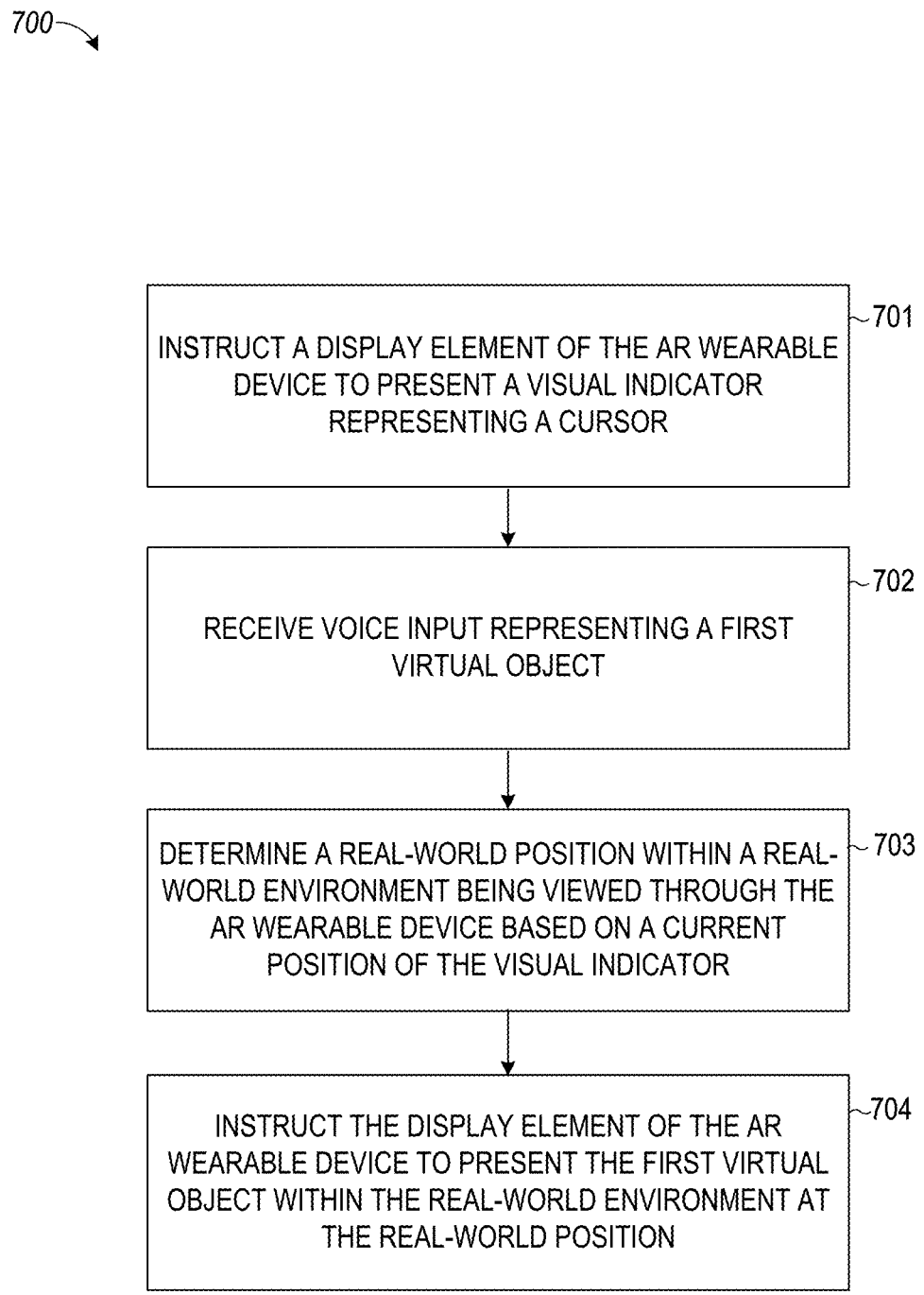
FIG. 7 is a flowchart illustrating example operations of the AR wearable device, in accordance with some examples.

FIG. 7 is a flowchart of a process 700, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 701, the AR application 310 instructs a display element of the AR wearable device to present a visual indicator representing a cursor, as discussed above.

At operation 702, the AR application 310 receives voice input representing a first virtual object, as discussed above.

At operation 703, the AR application 310 determines a real-world position within a real-world environment being viewed through the AR wearable device based on a current position of the visual indicator, as discussed above.

At operation 704, the AR application 310 instructs the display element of the AR wearable device to present the first virtual object within the real-world environment at the real-world position, as discussed above.

Machine Architecture

Figure 8:
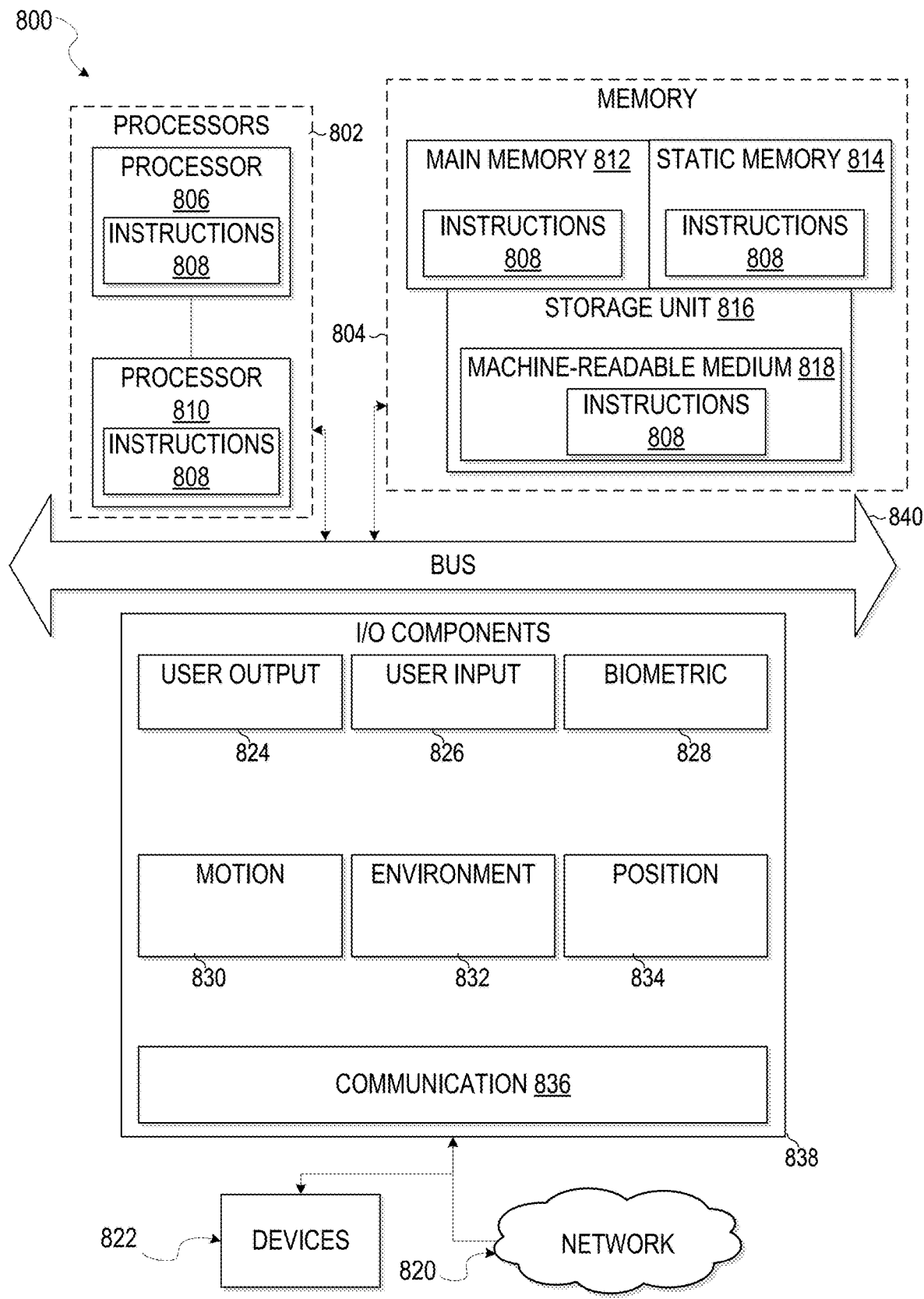
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein. The machine 800, for example, may comprise the client device 102 or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 802, memory 804, and input/output (I/O) components 838, which may be configured to communicate with each other via a bus 840. In an example, the processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single-core, a single processor with multiple cores (e.g., a multi-core processor), multiple processors with a single core, multiple processors with multiples cores, or any combination thereof.

The memory 804 includes a main memory 812, a static memory 814, and a storage unit 816, all accessible to the processors 802 via the bus 840. The main memory 804, the static memory 814, and the storage unit 816 store the instructions 808 embodying any one or more of the methodologies or functions described herein. The instructions 808 may also reside, completely or partially, within the main memory 812, within the static memory 814, within a machine-readable medium within the storage unit 816, within at least one of the processors 802 (e.g., within the processor's cache memory), or any suitable combination thereof, during execution thereof by the machine 800.

The I/O components 838 may include a wide variety of components to receive input, provide output, produce output, transmit information, exchange information, capture measurements, and so on. The specific I/O components 838 that are included in a particular machine will depend on the type of machine. For example, portable machines such as mobile phones may include a touch input device or other such input mechanisms, while a headless server machine will likely not include such a touch input device. It will be appreciated that the I/O components 838 may include many other components that are not shown in FIG. 8. In various examples, the I/O components 838 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 838 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 838 further include communication components 836 operable to couple the machine 800 to a network 820 or devices 822 via respective coupling or connections. For example, the communication components 836 may include a network interface component or another suitable device to interface with the network 820. In further examples, the communication components 836 may include wired communication components, wireless communication components, cellular communication components, Near Field Communication (NFC) components, Bluetooth® components (e.g., Bluetooth® Low Energy), components, and other communication components to provide communication via other modalities. The devices 822 may be another machine or any of a wide variety of peripheral devices (e.g., a peripheral device coupled via a USB).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 812, static memory 814, and memory of the processors 802) and storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed examples.

The instructions 808 may be transmitted or received over the network 820, using a transmission medium, via a network interface device (e.g., a network interface component included in the communication components 836) and using any one of several well-known transfer protocols (e.g., hypertext transfer protocol (HTTP)). Similarly, the instructions 808 may be transmitted or received using a transmission medium via a coupling (e.g., a peer-to-peer coupling) to the devices 822.

Software Architecture

Figure 9:
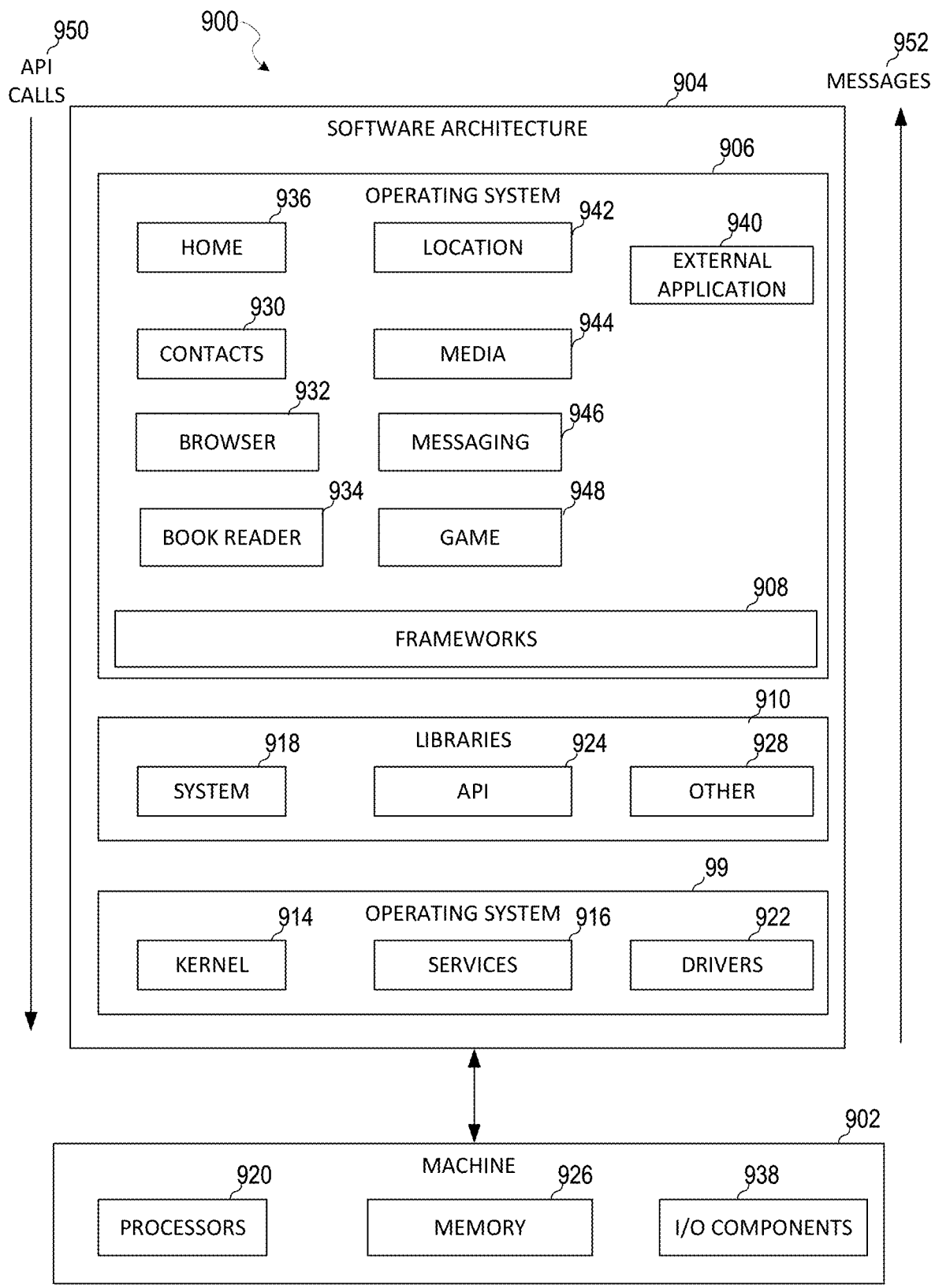
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In some examples, the applications 906 may include a home application 936, a contacts application 930, a browser application 932, a book reader application 934, a location application 942, a media application 944, a messaging application 946, a game application 948, and a broad assortment of other applications such as an external application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the external application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 940 can invoke the API calls 950 provided by the operating system 912 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 802 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
instructing, by one or more processors of an augmented reality (AR) wearable device, a display element of the AR wearable device to present a visual indicator representing a cursor;
determining that the cursor is positioned over a first virtual object within view of the AR wearable device;
in response to determining that the cursor is positioned over the first virtual object within view of the AR wearable device, presenting a message comprising a hint that textually informs a user about one or more keywords or commands to include in verbal input to perform an operation associated with the first virtual object;
receiving, by the one or more processors of the AR wearable device, voice input representing the first virtual object, the voice input comprising the one or more keywords or commands of the hint;
determining, by the one or more processors of the AR wearable device, a real-world position within a real-world environment being viewed through the AR wearable device based on a current position of the visual indicator;
instructing, by one or more processors of the AR wearable device, the display element of the AR wearable device to present the first virtual object within the real-world environment at the real-world position;
determining that the first virtual object is of a same type as a real-world object at the real-world position; and
in response to determining that the first virtual object is of the same type as the real-world object at the real-world position, modifying a visual attribute of the first virtual object to indicate that two objects of the same type cannot coexist at the real-world position.

2. The method of claim 1, further comprising:
determining that the voice input is associated with a move operation;
in response to determining that the voice input is associated with the move operation, modifying a visual attribute of the first virtual object from a first visual attribute to a second visual attribute to inform the user that the first virtual object has been transitioned to move in a way that tracks movement of the AR wearable device;
receiving input indicating placement of the first virtual object; and
in response to receiving the input, modifying the visual attribute of the first virtual object from the second visual attribute to the first visual attribute.

3. The method of claim 2, the first visual attribute comprising an opaque representation of the first virtual object, and the second visual attribute comprising a ghost representation of the first virtual object, further comprising maintaining presentation of the visual indicator in a static position as the AR wearable device is moved from a first position to a second position.

4. The method of claim 3, wherein the visual indicator is presented over a first portion of the real-world environment and at a center of the AR wearable device when the AR wearable device is at the first position, and wherein the visual indicator is presented over a second portion of the real-world environment and at the center of the AR wearable device when the AR wearable device is at the second position.

5. The method of claim 1, further comprising:
identifying, by the one or more processors of the AR wearable device, a real-world position of a first real-world object that corresponds to the current position of the visual indicator; and
modifying a size of the first virtual object based on a distance between the real-world position of the first real-world object and the AR wearable device.

6. The method of claim 1, further comprising:
modifying an orientation of the first virtual object based on an orientation of the real-world object over which the first virtual object is presented.

7. The method of claim 1, further comprising:
selecting a type of the first virtual object based on a type of the real-world object.

8. The method of claim 1, further comprising:
processing the voice input with a speech recognition engine;
obtaining one or more words associated with the voice input in response to processing the voice input;
determining context of the one or more words; and
selecting the first virtual object based on the one or more words and the determined context.

9. The method of claim 1, further comprising:
identifying a second object currently placed within the real-world environment at the real-world position;
determining that concurrent presentation of the first virtual object and the second object at the real-world position satisfies a presentation criterion comprising a plurality of objects that correspond to related types of objects; and
in response to determining that the concurrent presentation of the first virtual object and the second object at the real-world position satisfies the presentation criterion, enabling placement of the first virtual object at the real-world position.

10. The method of claim 1, further comprising:
identifying a second object currently placed within the real-world environment at the real-world position;
determining that concurrent presentation of the first virtual object and the second object at the real-world position violates a presentation criterion; and
in response to determining that the concurrent presentation of the first virtual object and the second object at the real-world position violates the presentation criterion, modifying a visual attribute of the first virtual object to indicate that the presentation criterion is being violated.

11. The method of claim 1, wherein the voice input comprises a command to add the first virtual object to the real-world environment, further comprising:
instructing the display element of the AR wearable device to present the first virtual object within the real-world environment at the real-world position with a first visual attribute;
detecting movement of the AR wearable device in which a different portion of the real-world environment is being viewed through the AR wearable device; and
moving the first virtual object to the different portion of the real-world environment as movement of the AR wearable device is being detected.

12. The method of claim 11, further comprising:
receiving additional voice input comprising a placement command; and instructing the display element of the AR wearable device to present the first virtual object within the different portion of the real-world environment with a second visual attribute.

13. The method of claim 1, further comprising:
identifying a second object currently placed within the real-world environment at the real-world position;
determining that concurrent presentation of the first virtual object and the second object at the real-world position fails to satisfy a presentation criterion comprising a plurality of objects that correspond to related types of objects; and
in response to determining that the concurrent presentation of the first virtual object and the second object at the real-world position fails to satisfy the presentation criterion, modifying a visual attribute of the first virtual object to indicate that the presentation criterion is being violated.

14. The method of claim 1, wherein the voice input comprises a command to move the first virtual object that is currently presented within a given portion of the real-world environment, further comprising:
instructing the display element of the AR wearable device to modify a visual attribute of the first virtual object from a first visual attribute to a second visual attribute;
detecting movement of the AR wearable device in which a different portion of the real-world environment is being viewed through the AR wearable device; and
moving the first virtual object to the different portion of the real-world environment as movement of the AR wearable device is being detected.

15. The method of claim 1, further comprising:
instructing the display element of the AR wearable device to display a plurality of graphical elements each corresponding to a different virtual object;
detecting movement of the AR wearable device;
moving the visual indicator representing the cursor to a new position within the real-world environment;
detecting that the new position corresponds to a given one of the graphical elements; and
selecting the first virtual object corresponding to the given one of the graphical elements in response to detecting that the new position corresponds to the given one of the graphical elements.

16. The method of claim 1, wherein the instructing the display element to present the first virtual object within the real-world environment at the real-world position comprises:
determining that a second virtual object is currently being displayed at the real-world position; and
presenting the first virtual object on top of the second virtual object.

17. The method of claim 1, further comprising:
receiving additional voice input comprising a more information command;
identifying a target virtual object over which the visual indicator is positioned;
obtaining textual information corresponding to the target virtual object; and
instructing the display element of the AR wearable device to present the textual information corresponding to the target virtual object, wherein the textual information comprises at least one of a textual price, a textual size, or a textual description of the target virtual object.

18. The method of claim 1, wherein an orientation of the visual indicator corresponds to an orientation of a surface over which the visual indicator is being presented.

19. A system comprising:
one or more processors of an augmented reality (AR) wearable device configured to perform operations comprising:
instructing a display element of the AR wearable device to present a visual indicator representing a cursor;
determining that the cursor is positioned over a first virtual object within view of the AR wearable device;
in response to determining that the cursor is positioned over the first virtual object within view of the AR wearable device, presenting a message comprising a hint that textually informs a user about one or more keywords or commands to include in verbal input to perform an operation associated with the first virtual object;
receiving voice input representing the first virtual object, the voice input comprising the one or more keywords or commands of the hint; determining a real-world position within a real-world environment being viewed through the AR wearable device based on a current position of the visual indicator;
instructing the display element of the AR wearable device to present the first virtual object within the real-world environment at the real-world position;
determining that the first virtual object is of a same type as a real-world object at the real-world position; and
in response to determining that the first virtual object is of the same type as the real-world object at the real-world position, modifying a visual attribute of the first virtual object to indicate that two objects of the same type cannot coexist at the real-world position.

20. A non-transitory computer-readable medium comprising instructions that, when executed by one or more processors of an augmented reality (AR) wearable device, configure the AR wearable device to perform operations comprising:
instructing a display element of the AR wearable device to present a visual indicator representing a cursor;
determining that the cursor is positioned over a first virtual object within view of the AR wearable device;
in response to determining that the cursor is positioned over the first virtual object within view of the AR wearable device, presenting a message comprising a hint that textually informs a user about one or more keywords or commands to include in verbal input to perform an operation associated with the first virtual object;
receiving voice input representing the first virtual object, the voice input comprising the one or more keywords or commands of the hint; determining a real-world position within a real-world environment being viewed through the AR wearable device based on a current position of the visual indicator;
determining a real-world position within a real-world environment being viewed through the AR wearable device based on a current position of the visual indicator;
instructing the display element of the AR wearable device to present the first virtual object within the real-world environment at the real-world position;
determining that the first virtual object is of a same type as a real-world object at the real-world position; and
in response to determining that the first virtual object is of the same type as the real-world object at the real-world position, modifying a visual attribute of the first virtual object to indicate that two objects of the same type cannot coexist at the real-world position.

* * * * *

UNITED STATES PATENT AND TRADEMARK OFFICE
CERTIFICATE OF CORRECTION

| | | |
|---|---|---|
| PATENT NO. | : 12,061,842 B2 | Page 1 of 1 |
| APPLICATION NO. | : 17/657840 | |
| DATED | : August 13, 2024 | |
| INVENTOR(S) | : Canberk et al. | |

It is certified that error appears in the above-identified patent and that said Letters Patent is hereby corrected as shown below:

In the Claims

In Column 26, Line 19, in Claim 19, after "hint;", insert a linebreak

In Column 26, Line 52, in Claim 20, after "hint;", insert a linebreak

Signed and Sealed this
Twenty-eighth Day of October, 2025

John A. Squires
*Director of the United States Patent and Trademark Office*